ns Patent [19]

Ray et al.

[11] 3,931,064
[45] Jan. 6, 1976

[54] POLYMER FOAMS
[75] Inventors: Neil Hunter Ray; Bruce Cochran Lane; Bryan Shaw, all of Runcorn, England
[73] Assignee: Imperial Chemical Industries Limited, London, England
[22] Filed: May 6, 1974
[21] Appl. No.: 467,556

[30] Foreign Application Priority Data
May 24, 1973  United Kingdom............... 24829/73

[52] U.S. Cl. ...................... 260/2.5 AK; 260/2.5 AJ; 260/2.5 AW
[51] Int. Cl.².... C08K 3/40; C08K 5/29; C08K 5/34
[58] Field of Search.... 260/2.5 AK, 2.5 AJ, 2.5 AW

[56]  References Cited
UNITED STATES PATENTS

| | | | |
|---|---|---|---|
| 3,243,388 | 3/1966 | Ulfstedt......................... | 260/2.5 AK |
| 3,365,315 | 1/1968 | Beck ............................. | 260/2.5 AK |
| 3,625,872 | 12/1971 | Ashida .......................... | 260/2.5 AK |
| 3,725,319 | 4/1973 | Frisch............................ | 260/2.5 AJ |
| 3,816,307 | 6/1974 | Woods .......................... | 260/2.5 AJ |
| 3,826,764 | 7/1974 | Weber........................... | 260/2.5 AK |

FOREIGN PATENTS OR APPLICATIONS
46-25016  7/1971  Japan ............................ 260/2.5 AJ OTHER PUBLICATIONS
Journal of Cellular Plastics, January 1965, pp. 25–31.

*Primary Examiner*—Donald E. Czaja
*Assistant Examiner*—C. Warren Ivy
*Attorney, Agent, or Firm*—Cushman, Darby & Cushman

[57] ABSTRACT

An isocyanate-based polymeric foam material having dispersed therein a particulate low-softening point inorganic oxide glass having a transformation temperature of not greater than 300°C, and optionally a blowing agent which is capable of liberating a non-flammable gas on heating above a temperature in the range 150° to 400°C.

12 Claims, No Drawings

POLYMER FOAMS

This invention relates to fire-retardant isocyanate-based polymer foams and more particularly to fire-retardant rigid isocyanate-based polymer foams.

It is known to incorporate fire-retardant additives into isocyanate-based foam materials, and in particular into rigid isocyanate-based foam materials. The additives conventionally used are halogenated materials, for example, halogenated paraffins and halogenated phosphate esters, which may be used in conjunction with other additives, for example, antimony compounds. Conventional fire-retardant additives do indeed decrease the flammability of isocyanate-based foams, especially rigid foams, as measured by tests such as the oxygen index test (ASTM D 2863-70) and burning rate tests (ASTM D 1692-68), but have the disadvantages that they generally increase the amount of smoke generated when the foam containing them is burned, they may be leached out of the foam, and, in the case where the foam is a rigid foam, they may act as plasticizers thereby decreasing the rigidity of the foam.

We have now found that the incorporation of a low softening point glass, particularly a phosphate glass, into an isocyanate-based foam, and especially into a rigid isocyanate-based foam, confers a degree of fire retardancy upon the foam, and may also give less smoke generation on combustion of the foam than is produced by combustion of foams containing conventional fire-retardant additives.

The softening point of a glass is a quantity defined by ASTM C338-57, but as it is more convenient to measure the transformation temperature (Tg) of a glass, a low softening point glass for the purposes of the present invention is defined as one having a transformation temperature not greater than 300°C. An approximate correlation between softening point and transformation temperature is that the softening point is generally between 50° and 70°C above the transformation temperature.

The transformation temperature of a glass is defined herein as the value determined by differential calorimetry using the Du Pont Differential Thermal Analyser according to the following procedure. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

According to the present invention there is provided a composition comprising an isocyanate-based polymeric foam material and dispersed therein a particulate low softening point inorganic oxide glass having a transformation temperature of not greater than 300°C.

The isocyanate-based polymeric foam material is a material produced by reacting a liquid mixture comprising a polyisocyanate containing two or more isocyanate groups and a compound containing two or more groups reactive with isocyanate groups, for example, hydroxyl groups, amino groups, or carboxylic acid groups, and foaming the mixture during the reaction.

The product of the foaming and of the reaction is a cross-linked polymeric foam material. The degree of cross-linking determines to some extent the physical nature of the foam material, and in particular whether or not the foam material is a rigid or flexible material, according to principles well-known in the art. In general, the greater the degree of cross-linking the more rigid is the foam material. The present invention may be applied to rigid and flexible foam materials but is preferably applied to rigid foam materials.

The isocyanate-based polymeric foam material may be any polymeric foam obtained by a reaction involving a substantial proportion of a polyisocyanate, and includes polyurethane foams obtained by reaction of a polyisocyanate with, for example, a branched polyol, polyisocyanurate foams obtained by trimerisation of the isocyanate groups of a polyisocyanate, and isocyanate/isocyanurate foams produced by reacting an excess of polyisocyanate with a polyol and simultaneously or subsequently trimerising the unreacted isocyanate groups. Polyols containing ether linkages or ester linkages may be used, and the polyisocyanates may be aliphatic or aromatic. Suitable isocyanate-based foam materials require no further description as they are well-known in the art and include, for example, those disclosed in British Pat. Nos. 874,430, 908,337, 924,111, 1,146,661 and 1,184,893.

The inorganic oxide glass is suitably a phosphate glass, that is, an inorganic oxide glass comprising at least 25 mole % of $P_2O_5$. Preferably, the inorganic oxide glass which is present in the composition has a transformation temperature of not greater than 250°C, more preferably not greater than 200°C, and the glass preferably comprises at least 50 mole % $P_2O_5$ and more preferably at least 60 mole % $P_2O_5$ on account of the superior fire-retardant effects obtained with such preferred glasses.

Suitable inorganic oxide glasses for use in the compositions of the present invention are those having suitable transformation temperatures and described in our copending U.S. Pat. No. 3,804,645 (now published as Belgian Pat. No. 789,866), U.S. Ser. No. 293,538 (now published as Belgian Pat. No. 789,867), U.S. Ser. No. 329,167 (now published as Belgian Pat. No. 795,152) and U.S. Ser. No. 350,496 (now published as Belgian Pat. No. 798,480), the disclosures of which are incorporated herein by reference. The aforementioned copending applications also describe suitable methods for the preparation of the inorganic oxide glasses.

Where the inorganic oxide glass is a phosphate glass its durability to water, especially important if the foam material containing the glass is to be contacted with water, may be improved if the glass contains $B_2O_3$. The glass preferably contains from 1.2 to 3.5 mole % of $B_2O_3$. The glass may contain one or more alkali metal oxides, preferably at least 5 mole % of such oxide, and/or one or more alkaline earth metal oxides, preferably at least 5 mole % of such oxide.

A glass which may be mentioned in particular is a glass consisting essentially of, that is consisting of at least 98 mole % of, the following components in the mole % proportions stated; $B_2O_3$ 1.2 to 3.5, $P_2O_5$ 50 to 72, PbO 0 to 30, transistion metal oxide 0 to 5, and the remainder, if any, being oxides selected from alkali metal oxides, alkaline earth metal oxides and zinc oxide. The aforementioned composition excludes water which may be present in the composition in a proportion of, for example, up to 5% by weight.

A preferred inorganic oxide glass is one consisting essentially of, in mole % and excluding any water which may be present, $B_2O_3$ 1.2 to 3.5, $P_2O_5$ 58 to 70, PbO less than 15, transition metal oxide 0 to 5, the remainder being oxides selected from alkali metal oxides, alkaline earth metal oxides, and zinc oxide.

The glasses used in the compositions of the invention may include hydrogen in the form of combined water, generally in an amount of not greater than 5 weight % of water. Other metal oxides which may be present in the glasses are the oxides of Al, Ce, V, Cr, W, Mo, Sb and/or Bi provided, of course that the glass has a transformation temperature of not greater than 300°C.

The inorganic oxide glass may be present in the composition of the invention in the form of particles, flakes and/or fibres. The glass may be mixed with a liquid component or components and then the remaining component or components may be added and reaction and foaming to produce the foam may be caused or allowed to take place, e.g., by heating. It is especially convenient to follow this procedure where admixture of all of the components results in immediate foaming by reaction of the components. Where admixture of all the components does not produce an immediate foaming reaction the glass may be added to a mixture of the components and the foaming reaction may be carried out as desired, e.g., by addition of a separate foaming agent and heating if necessary.

In order to facilitate mixing and dispersion of the glass in the reaction mixture from which the foam is produced, and thus to assist dispersion of the glass in the resultant foam, the glass is preferably in the form of a fine powder of particle size in the range 0.1 to 25 $\mu$m, more preferably 1 to 5 $\mu$m, although larger particle size glass may be used, for example, glass having a size in the range 0.1 to 300 $\mu$m.

The inorganic oxide glass may be coarsely granulated and then ground to a fine powder, for example, by ball milling, then dispersed in a liquid reactant. It may be desirable to mill the glass in the presence of up to 5% of a dispersing agent, for example, Silanox (Cabot Corporation) hydrophobic silica in order to improve the dispersion of the glass in the reactant, particularly for acidic glasses containing over 65 mole % $P_2O_5$.

In general, in order that a flame-retardant effect may be achieved, the inorganic oxide glass will be present in the composition in a proportion of at least 2% by weight of the foam material in the composition. Generally, little further advantage is obtained by including in the composition more than 60% of inorganic oxide glass by weight of the foam material. Preferably, the inorganic oxide glass is present in the composition in a proportion in the range 10 to 30% by weight of the foam material. The composition may also contain particles, flakes or fibres of other filling or reinforcing material, for example E-glass.

Phosphate glasses containing a high proportion (for example, above 60 mole %) of $P_2O_5$ may be susceptible to hydrolysis by water, and this may impair the properties of an isocyanate-based foam containing the glass. This effect may be reduced by coating the glass with a hydrophobic solid material for example magnesium stearate, or with a coupling agent for example an organosilane capable of increasing the bonding of the glass to the foamed polymer.

We have found that the presence of a blowing agent in the composition of the present invention may, in addition to improving the fire-retardant effect, also result in a further decrease in smoke generation when compared with the effect observed in the absence of blowing agent. The blowing agent is suitably a solid material and is a material which, when heated above a temperature in the range 150° to 400°C decomposes with evolution of a non-flammable gas or gases, for example, water, nitrogen, ammonia or carbon dioxide. The blowing agent should not volatilize or evolve gas during production of the foam material. It is only required to do so when the foam material is heated or burned.

Examples of suitable blowing agents are dicyandiamide (N-cyanoguanidine, DCDA), melamine, guanidinium carbonate, N-nitro-N'-cyanoguanidine, uracil, barbituric acid and phosphoramide, of which DCDA and melamine are preferred. Mixtures of two or more blowing may be used, and may be more effective than the same weight of a single one.

A suitable amount of blowing agent for use in the composition is from 2 to 20% by weight of the foam material in the composition, preferably 5 to 10% by weight. The blowing agent is conveniently incorporated into the composition by the methods hereinbefore described for incorporation of the inorganic oxide glass.

The composition of the invention, in addition to foam material and inorganic oxide glass, and optionally blowing agent, may contain one or more other materials, for example, one or more conventional fire-retardant additives, e.g., halogenated phosphate esters, although no particular advantage is thereby to be obtained.

Compositions according to the invention, especially those which contain rigid foam materials, may find application in structural applications, for example, the insulation of cavity walls, and for other thermal insulation applications.

The invention is illustrated by the following Example.

Example

An inorganic glass was prepared having the composition (mole %), $P_2O_5$ 65.8, $B_2O_3$ 2.3, PbO 13.1, $Na_2O$ 9.4, $Li_2O$ 9.4 by heating a mixture of 88% orthophosphoric acid, boric oxide, litharge, sodium carbonate and lithium carbonate in the appropriate molar proportions to 350°C for 6 hours, then refining at 750°C until a glass having a transformation temperature of 155°C was produced.

The glass was coarsely granulated, then 700 g of the glass was ball milled with 14 g Silanox (Cabot Corporation) hydrophobic silica for 40 hours, then screened through a 120 mesh sieve. The median particle size was approximately 2–3 $\mu$m by microscopic examination, some particles being as large as 25 $\mu$m.

Four rigid polyurethane foams were prepared as described below, A being an unmodified foam, B being a conventional fire-retardant foam containing tris ($\beta$-chloro-ethyl) phosphate (TCEP), C containing no TCEP but 13.5% by weight of the inorganic oxide glass powder and D being as C but containing in addition 4.6% by weight of blowing agent dicyandiamide (DCDA) and melamine. The parts by weight of each component used are shown in Table I. In each case all of the components except the diisocyanatodiphenylmethane were blended together, then the mixture was rapidly blended with the diisocyanatodiphenylmethane, the product transferred to a mould and allowed to rise to give a rigid polyurethane foam.

Table I

| Component | parts by weight | | | |
|---|---|---|---|---|
| | A | B | C | D |
| oxypropylated glycerol, hydroxyl value 540 mg KOH/g | 154 | 140 | 140 | 140 |
| triethanolamine | 15.4 | 14 | 14 | 14 |
| N,N-dimethylcyclohexylamine | 2.3 | 2.1 | 3.5 | 3.5 |
| water | 3.1 | 2.8 | 2.8 | 2.8 |
| siloxane oxyalkylene copolymer | 1.23 | 1.1 | 1.1 | 1.1 |
| trichlorofluoromethane | 30.1 | 30.0 | 38.0 | 41.0 |
| tris($\beta$-chloroethyl) phosphate | — | 42 | — | — |
| phosphate glass powder | — | — | 71.3 | 71.3 |
| DCDA | — | — | — | 3.6 |
| melamine | — | — | — | 21.7 |
| crude diisocyanatodiphenyl-methane | 322.2 | 297 | 297 | 297 |

Specimens cut from all four foams were tested for mechanical, fire-retardant and smoke emission properties. The burning tests used were ASTM D 1692-68, which measures whether a strip of material ignited by a flame which is then removed is non-burning (extinguished before reaching a mark on the specimen close to the applied flame), self extinguishing (fire extinguished before reaching a more distant mark), or burning (fire not extinguished before reaching the second mark), and ASTM D 2863-70 (Oxygen Index). In the latter test, the specimen is burned in a controlled oxygen-nitrogen atmosphere, the Oxygen Index being the percentage of oxygen in the atmosphere which is necessary to just support combustion of the material.

The smoke emission test used was based on ASTM D 2843-70 in which a specimen is burned in an enclosed box (the XP-2 box) and the degree of attenuation of a light beam across the box is measured as a function of time. The maximum obscuration reached was measured, but whereas the standard procedure calls for calculation of a 'smoke density rating' proportional to the area under the obscuration/time curve for a time of 4 minutes from ignition, in this case the time required to reach the maximum obscuration was measured.

Results are given in Table II.

Table II

| | A | B | C | D |
|---|---|---|---|---|
| Density (Kg m$^{-3}$) | 37.6 | 41.1 | 37.9 | 39.9 |
| % Closed cells | 93 | 92 | 92 | 91 |
| Brittleness (% mass loss/min) | 2.3 | 2.3 | 3.6 | 4.0 |
| Mean strength (KN m$^{-2}$) | 151 | 146 | 128 | 140 |
| ASTM D 1692-68 | burning | S.E.* | S.E. | S.E. |
| Oxygen Index | 21% | 24% | 23% | 24% |
| Smoke emission: | | | | |
| max obscuration (%) | 75 | 91 | 87 | 78 |
| reached after (sec) | 22 | 19 | 22 | 28 |

S.E.*= self extinguishing

It is seen that the incorporation of low softening point glass powder and optionally blowing agent does not adversely affect the mechanical properties of the foam (except for a slight increase in brittleness) and gives equivalent fire-retardance to that obtained from a conventional additive (TCEP) with considerably less smoke emission.

What we claim is:

1. A composition comprising an isocyanate-based polymeric foam material selected from polyurethane, polyisocyanurate, and polyurethane/polyisocyanurate foam materials and produced by reacting a foamable liquid mixture of a polyisocyanate containing two or more isocyanate groups and a compound containing two or more groups reactive with isocyanate groups, and dispersed in said foam material inorganic oxide glass powder having a particle size in the range 0.1 to 300 microns the inorganic oxide glass having a transformation temperature of not greater than 300°C.

2. A composition as claimed in claim 1 in which the foam material is a rigid foam material.

3. A composition as claimed in claim 1 in which the foam material is a polyurethane foam.

4. A composition as claimed in claim 1 in which the inorganic oxide glass is a phosphate glass comprising at least 25 mole % of $P_2O_5$.

5. A composition as claimed in claim 4 in which the inorganic oxide glass comprises at least 50 mole % of $P_2O_5$.

6. A composition as claimed in claim 5 in which the inorganic oxide glass comprises from 1.2 to 3.5 mole % of $B_2O_3$.

7. A composition as claimed in claim 5 in which the inorganic oxide glass consists essentially of the following components, in mole % and excluding water which may be present, $B_2O_3$ 1.2 to 3.5, $P_2O_5$ 50 to 72, PbO 0 to 30, transition metal oxides 0 to 5, and the remainder, if any, being oxides selected from alkali metal oxides, alkaline earth metal oxides and zinc oxide.

8. A composition as claimed in claim 7 in which the inorganic oxide glass consists essentially of the following components, in mole% and excluding water, $B_2O_3$ 1.2 to 3.5, $P_2O_5$ 58 to 70, PbO less than 15, transition metal oxide 0 to 5, the remainder being oxides selected from alkali metal oxides, alkaline earth metal oxides and zinc oxide.

9. A composition as claimed in claim 1 in which the inorganic oxide glass in present in the form of particles having a size in the range 0.1 to 25 microns.

10. A composition as claimed in claim 1 in which the inorganic oxide glass is present in a proportion of 10 to 30% by weight of the foam material.

11. A composition as claimed in claim 1 in which there is present a blowing agent which is a material which, when heated above a temperature 150° tc 400°C., decomposes with evolution of a non-flammable gas and does not volatilize or evolve gas during foam formation.

12. A composition as claimed in claim 1 in which the blowing agent is present in a proportion of from 5 to 10% by weight of the foamed material.

* * * * *